United States Patent
Zhu

(10) Patent No.: US 9,010,732 B2
(45) Date of Patent: Apr. 21, 2015

(54) DRIVE DEVICE FOR BELT AXIS OF A WINCH

(71) Applicant: ZhengZhong Zhu, Taizhou (CN)

(72) Inventor: ZhengZhong Zhu, Taizhou (CN)

(73) Assignee: Zhejiang Topsun Logistic Control Co., Ltd., Taizhou (CN)

( * ) Notice: Subject to any disclaimer, the term of this patent is extended or adjusted under 35 U.S.C. 154(b) by 134 days.

(21) Appl. No.: 13/744,425

(22) Filed: Jan. 18, 2013

(65) Prior Publication Data

US 2014/0082903 A1 Mar. 27, 2014

(30) Foreign Application Priority Data

Sep. 26, 2012 (CN) .......................... 2012 1 0362149

(51) Int. Cl.
*B21F 9/00* (2006.01)
*B66F 3/00* (2006.01)
*B60P 7/08* (2006.01)

(52) U.S. Cl.
CPC ............ *B60P 7/0853* (2013.01); *Y10T 24/2191* (2015.01)

(58) Field of Classification Search
USPC ....... 254/214, 223, 217, 218; 24/70 R, 70 ST, 24/69 ST, 69 CT, 68 CD; 410/103
See application file for complete search history.

(56) References Cited

U.S. PATENT DOCUMENTS

| | | | |
|---|---|---|---|
| 6,960,053 B2 * | 11/2005 | Woodruff ........................ 410/12 |
| 7,410,334 B2 * | 8/2008 | McGrew ........................ 410/100 |
| 7,413,170 B2 * | 8/2008 | Ruan .............................. 254/244 |
| 7,559,729 B2 * | 7/2009 | Ruan .............................. 410/103 |
| 7,618,021 B2 * | 11/2009 | Leone et al. ................... 254/223 |
| 8,336,861 B2 * | 12/2012 | Chou .............................. 254/365 |
| 8,550,436 B2 * | 10/2013 | Wang ............................. 254/223 |
| 2002/0195594 A1 * | 12/2002 | Cauchon ....................... 254/243 |

FOREIGN PATENT DOCUMENTS

CN 200920120909.5 5/2009

* cited by examiner

*Primary Examiner* — Emmanuel M Marcelo
(74) *Attorney, Agent, or Firm* — Minder Law Group; Willy H. Wong

(57) ABSTRACT

A drive device for a belt axis of a winch, to address the problems existing in the conventional drive device for the belt axis of the winch including a short service life and a high cost. The drive device is disposed at the end of the belt axis of the winch. The drive device comprises a stationary seat and a rotary cylinder. The rotary cylinder is provided with a socket for inserting a crowbar. The stationary seat is fixedly connected with the belt axis. The rotary cylinder is axially fixed to the stationary seat. A unidirectional mechanism is provided between the rotary cylinder and the belt axis and operates by means of the engagement of teeth of the ratchet wheel. The belt axis is brought into continuous one-way rotation by using the unidirectional mechanism while the rotary cylinder is turned back and forth.

12 Claims, 5 Drawing Sheets

DRIVE DEVICE FOR BELT AXIS OF A WINCH

BACKGROUND OF THE INVENTION

1. Related Applications

This application claims benefit to Chinese Patent Application No. 201210362149.5, filed Sep. 26, 2012. The above application is incorporated by reference herein.

2. Field of Invention

The present invention relates to a winch, particularly a drive device for the belt axis of the winch in the mechanical field.

RELATED ART

The winch is a tool frequently used to transport the goods by vehicles. Generally speaking, the goods are bound by using the winch to prevent them falling off or colliding with each other. The winch has a support, a rotating shaft on the support and a binding belt connected to the rotating shaft. The rotating shaft has to be turned to tighten the binding belt to tie up the goods. Obviously, the winch could be used safely and conveniently tie up the goods, which plays a very important role in transportation by vehicles.

For example, the applicant once filed another Chinese patent application titled as "a drive device for a belt axis of a winch", the publication number of which is CN201457211U. The drive device is disposed at the protruding end of the belt axis at the side of the winch support, comprising a stationary seat and a rotary body, in which the stationary seat is connected with the protruding end of the belt axis and the rotary is set on the stationary seat. A spring is provided between the rotary body and the stationary seat, by the elastic force of which the end of the stationary seat abuts against the end of the rotary body. Unidirectional teeth are provided between the stationary seat and the rotary body and are engageable with each other.

It is obvious that the unidirectional teeth make the stationary seat continuously rotate only in one way when the rotary body is turned back and forth. As such, the belt axis is driven to rotate to eventual tighten the binding belt.

However, the unidirectional teeth on the stationary seat and the rotary body would probably wear down as the winch has been used for a long period, which further fails the drive device. Therefore, the drive device has a short life time and a high use cost.

SUMMARY OF THE INVENTION

In order to address the aforementioned problems existing in the prior art, the present invention provides a drive device for a belt axis of a winch which has a simple structure and high reliability in use.

In one aspect of the invention, the invention provides a drive device for a belt axis of a winch disposed at one end of the belt axis of the winch. The drive device comprises a stationary seat and a rotary cylinder. The rotary cylinder is provided with a socket for inserting a crowbar. The stationary seat is fixedly connected with the belt axis of the winch. Both the stationary seat and the belt axis are cylindrical. The rotary cylinder is fixed to the stationary seat and has a central axis overlapped with that of the stationary seat. A unidirectional mechanism is provided between the rotary cylinder and the belt axis and operates by means of the engagement of teeth of the ratchet wheel. The belt axis could be brought into continuous one-way rotation by using the unidirectional mechanism while the rotary cylinder is turned back and forth.

In the drive device for the belt axis of the winch, the crowbar is inserted into the socket and then is pulled back and forth, which brings the rotary cylinder to turn back and forth. In this process, the belt axis of the winch continuously rotates in one way through the unidirectional mechanism, and the binding belt is tightened as such.

In the drive device for the belt axis of the winch, the unidirectional mechanism includes pawls hinged to the stationary seat and a ratchet wheel fixedly connected with the end of the rotary cylinder, in which the pawls could be engaged with the ratchet wheel.

In the drive device for the belt axis of the winch, the stationary seat has a chassis in the shape of a round disk and a circular compression ring. The chassis is fixedly connected to the end of the belt axis. The compression ring is fixedly connected to the chassis via connecting pins. The pawls are hinged between the compression ring and the chassis by means of the connecting pins.

While the rotary cylinder is turned back and forth, the chassis could only rotate in one way by means of the pawls and the ratchet wheel. That is to say, the belt axis would be eventually brought into continuous one-way rotation.

The ends of the connecting pins are fixedly connected with the chassis and the compression ring respectively. Specifically, four connecting pins are employed here to fix the chassis to the compression ring firmly. Meanwhile, the pawls are hinged via the connecting pins, which saves space and makes reasonable use of the connecting pins.

In the drive device for the belt axis of the winch, the rotary cylinder has a projecting stop edge at the inner end. The stop edge is disposed between the compression ring and the pawls and the pawls are located between the compression ring and the chassis.

As the stop edge is pressed against the inner side of the compression ring, such a configuration could make the rotary cylinder rotate in relation to the compression ring, and the rotary cylinder would not be separated from the compression ring.

In the drive device for the belt axis of the winch, an annular retainer is provided between the edge of the chassis and the edge of the compression ring.

The retainer, the chassis and the compression ring form a sealed cavity together. The pawls and the ratchet wheel are located within the cavity to prevent impurities entering into the ratchet wheel.

In the drive device for the belt axis of the winch, the inner side of the retainer is fixedly connected with a plurality of supporting post, and the ends of the supporting posts are pressed against the chassis and the compression ring respectively.

The strength of the stationary seat is enhanced by the supporting posts to prevent it from being distorted under external forces.

In the drive device for the belt axis of the winch, the retainer has a cylindrical supporting seat integrally connected therewith on its inner side. The supporting posts are connected with the supporting seat.

The supporting posts are fixed by the supporting seat.

In the drive device for the belt axis of the winch, the retainer and the supporting seat are both made of plastic materials. The supporting seat has a gap extending therethrough on its side.

The retainer and the supporting seat could be molded at one time by using the plastic materials. The gap on the side of the supporting seat provides the supporting seat with certain elasticity to firmly position the supporting posts within the supporting seat.

In the drive device for the belt axis of the winch, the chassis is fixedly connected with the end of the belt axis by welding.

In the drive device for the belt axis of the winch, the ratchet wheel is fixedly connected with the end of the rotary cylinder by welding.

The chassis could be fixedly connected with the belt axis in a reliable manner, and the ratchet wheel could be fixedly connected with the rotary cylinder firmly.

Compared with the prior art, in the drive device for the belt axis of the winch, the cavity formed by the chassis, the compression ring and the retainer is sealed in such a manner that the impurities would not easily entered into the ratchet wheel or the pawls, which enhances the reliability of the winch in use. Furthermore, in the winch having the drive device, the rain water would not tend to enter into the ratchet wheel even when the winch is used in rainy days.

In addition, the device is only composed of the ratchet wheel, the pawls, the stationary seat and the rotary cylinder, and thus has a relatively simple structure and a relatively low cost.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below for illustration only, and thus are not limitative of the present invention, and wherein.

DETAILED DESCRIPTION OF THE INVENTION

Figure 1:
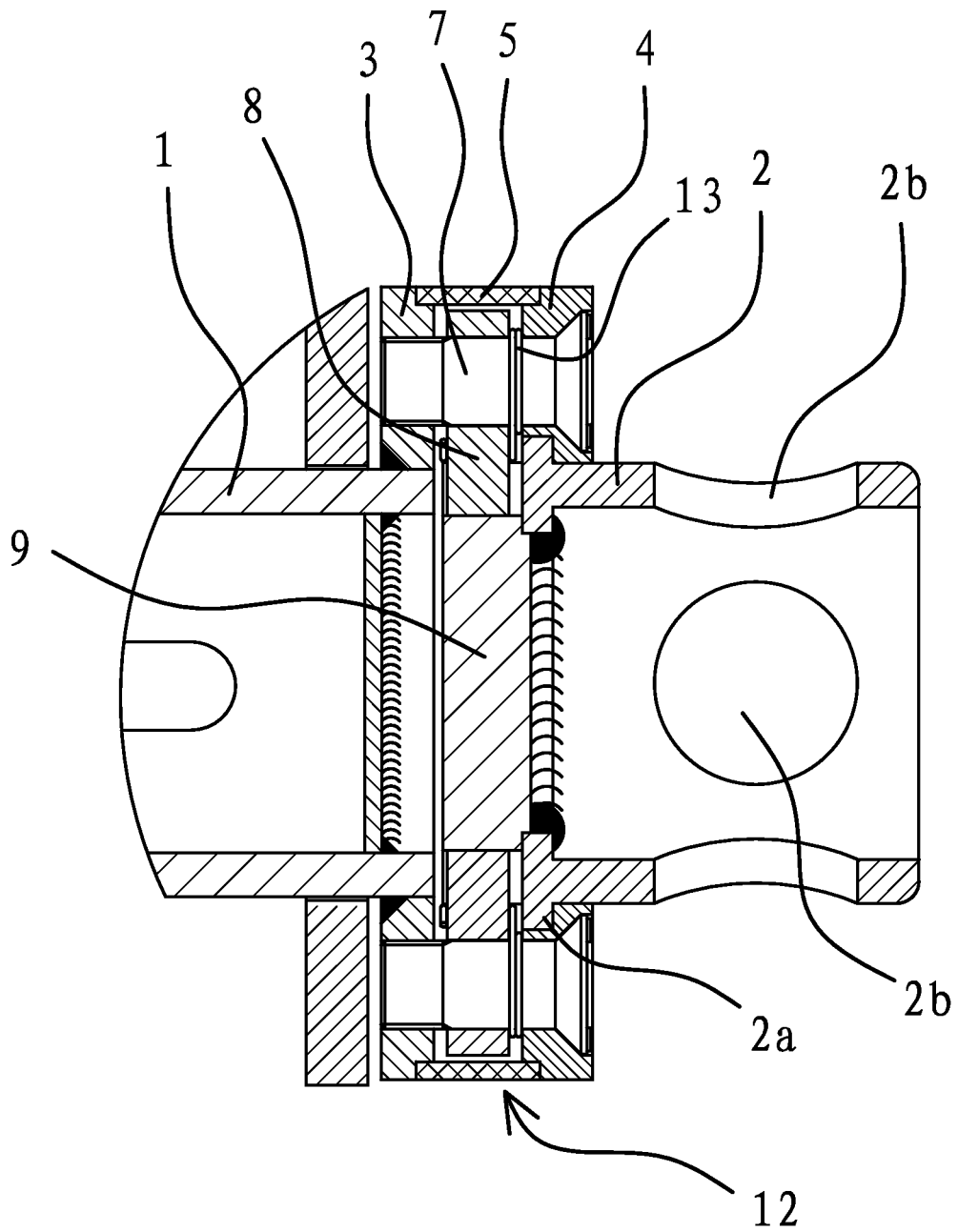
FIG. 1 is a sectional schematic diagram of the drive device for the belt axis of the winch.
Figure 2:
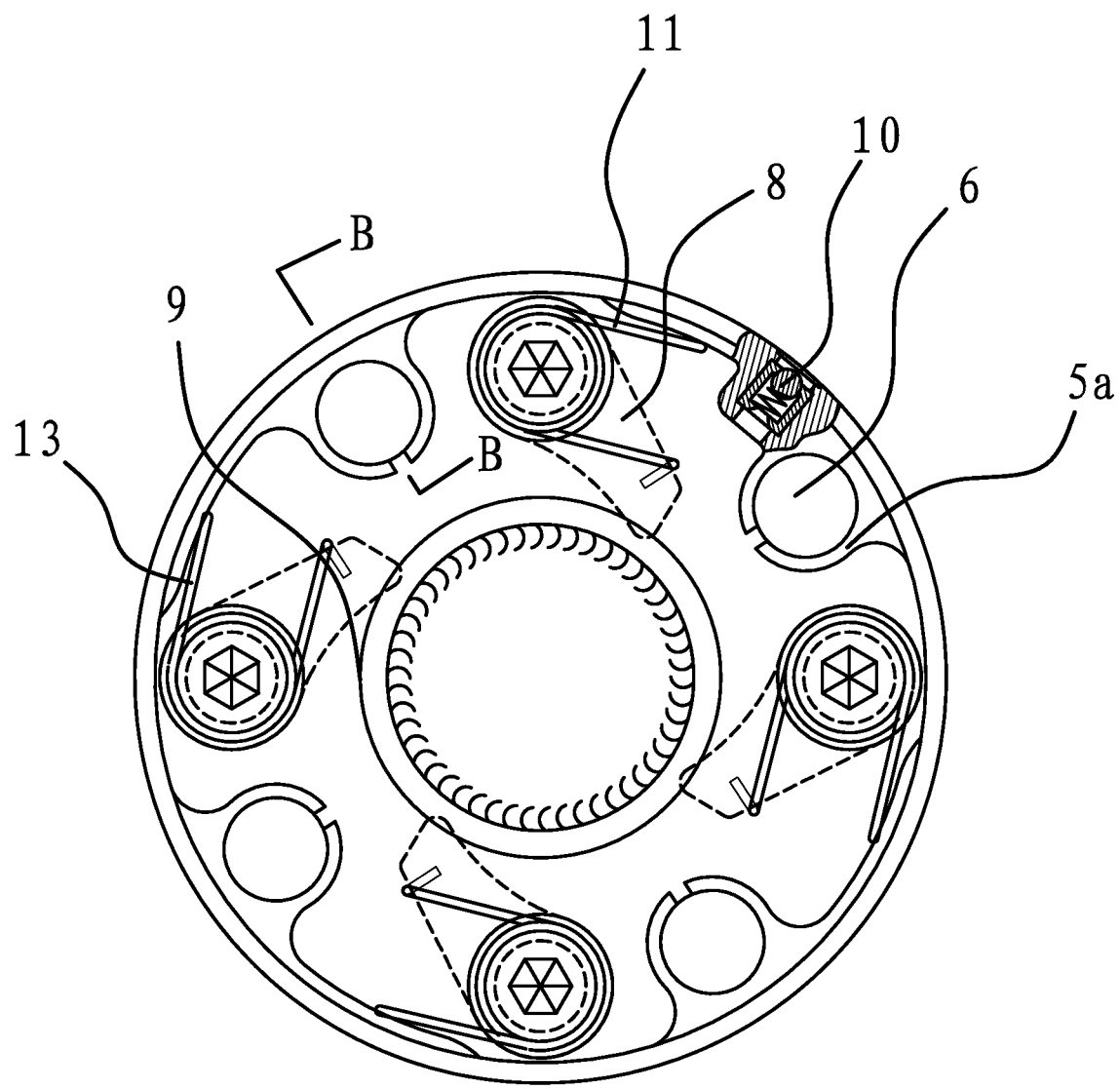
FIG. 2 is a schematic diagram of the pawls and the ratchet wheel in the drive device for the belt axis of the winch.

As shown in FIGS. 1 and 2, the drive device for the belt axis of the winch is disposed at the end of the belt axis 1 of the winch. The drive device has a stationary seat 12 and a rotary cylinder 2, and the rotary cylinder 2 has a socket 2b for inserting a crowbar. The stationary seat 12 is fixedly connected with the belt axis 1 of the winch. Both the stationary seat 12 and the belt axis 1 are cylindrical. The rotary cylinder 2 is fixed to the stationary seat 12 and has a central axis overlapped with that of the stationary seat 12. A unidirectional mechanism is provided between the rotary cylinder 2 and the belt axis 1, which operates by means of the engagement of teeth of the ratchet wheel. While the rotary cylinder 2 is turned back and forth, the belt axis 1 could be brought into continuous one-way rotation by using the unidirectional mechanism. The unidirectional mechanism includes four circumferentially distributed pawls 8 which are hinged to the stationary seat and a ratchet wheel 9 fixedly connected with the end of the rotary cylinder 2, in which the pawls 8 could be engaged with the ratchet wheel 9. In this embodiment, the ratchet wheel 9 is fixed to the end of the rotary cylinder 2 by welding.

The stationary seat 12 has a chassis 3 in the shape of a round disk and a circular compression ring 4. The chassis 3 is fixedly connected to the end of the belt axis 1 by welding. The compression 4 ring is fixedly connected to the chassis 3 via a connecting pin 7. Each pawl 8 is hinged between the compression ring 4 and the chassis 3 by means of the connecting pin 7. A spring 13 is covered on each connecting pin 7. The ends of the spring 13 are pressed against the compression ring 4 and the corresponding pawl 8 respectively. The pawls 8 tend to be engaged with the ratchet wheel 9 by means of the elastic force of the springs 13.

The rotary cylinder 2 has a projecting stop edge 2a at the inner end. The compression ring 4 is covered on the rotary cylinder 2 and the stop edge 2a is disposed between the compression ring 4 and the pawls 8 which are located between the compression ring 4 and the chassis 3. Moreover, the springs 13 are covered on the connecting pins 7 between the compression ring 4 and the pawls 8.

Figure 3:
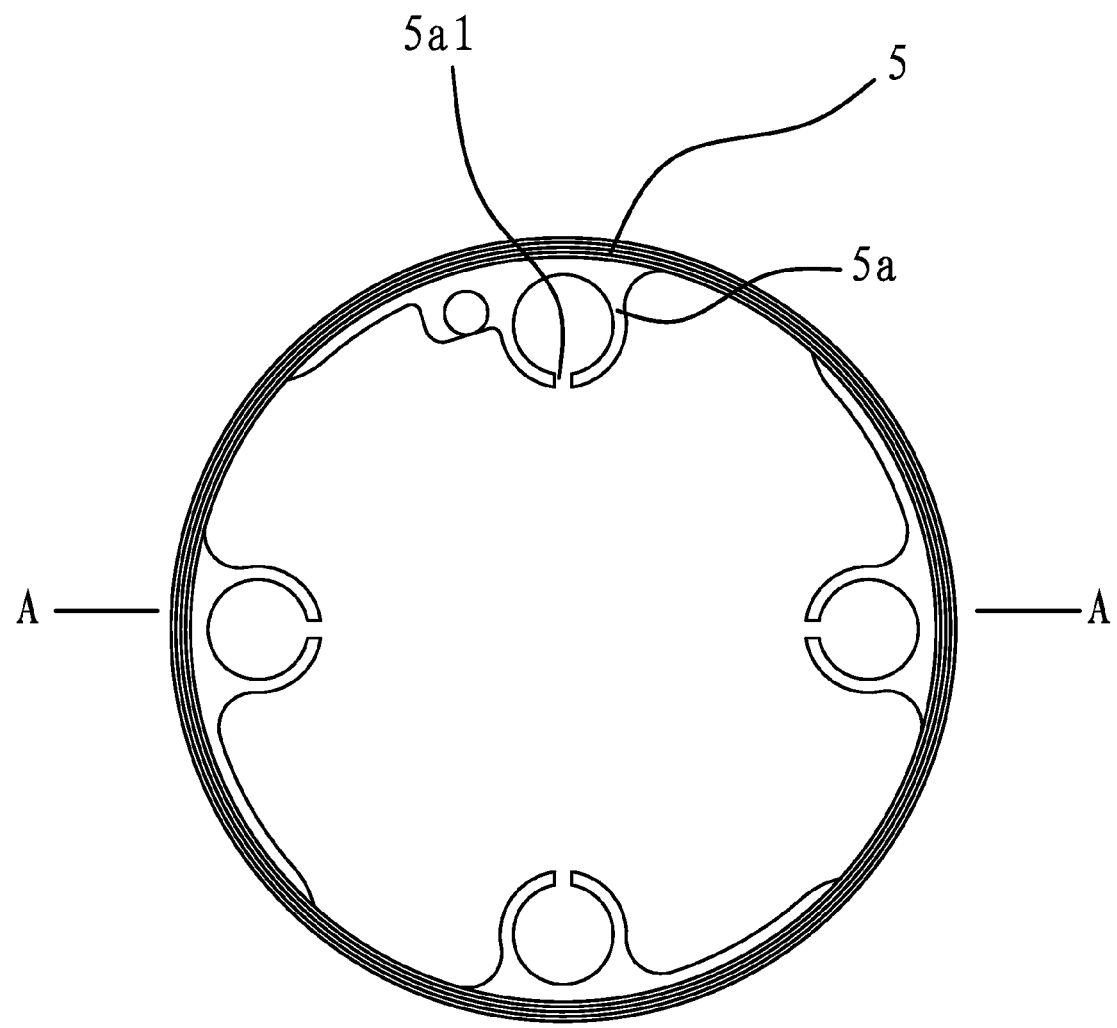
FIG. 3 is a schematic diagram of the retainer in the drive device for the belt axis of the winch.
Figure 4:
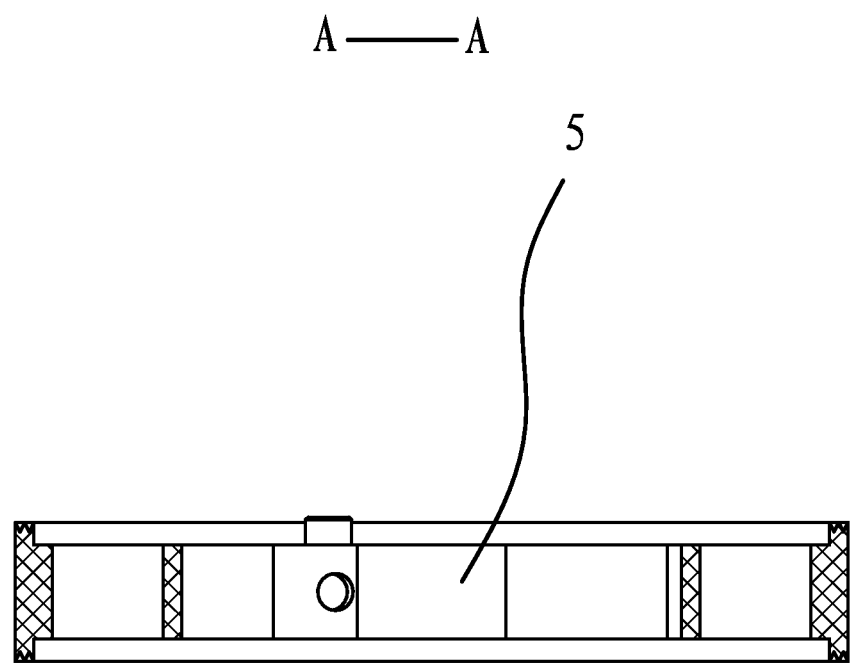
FIG. 4 is a sectional schematic diagram taken along A-A in FIG. 3.
Figure 5:
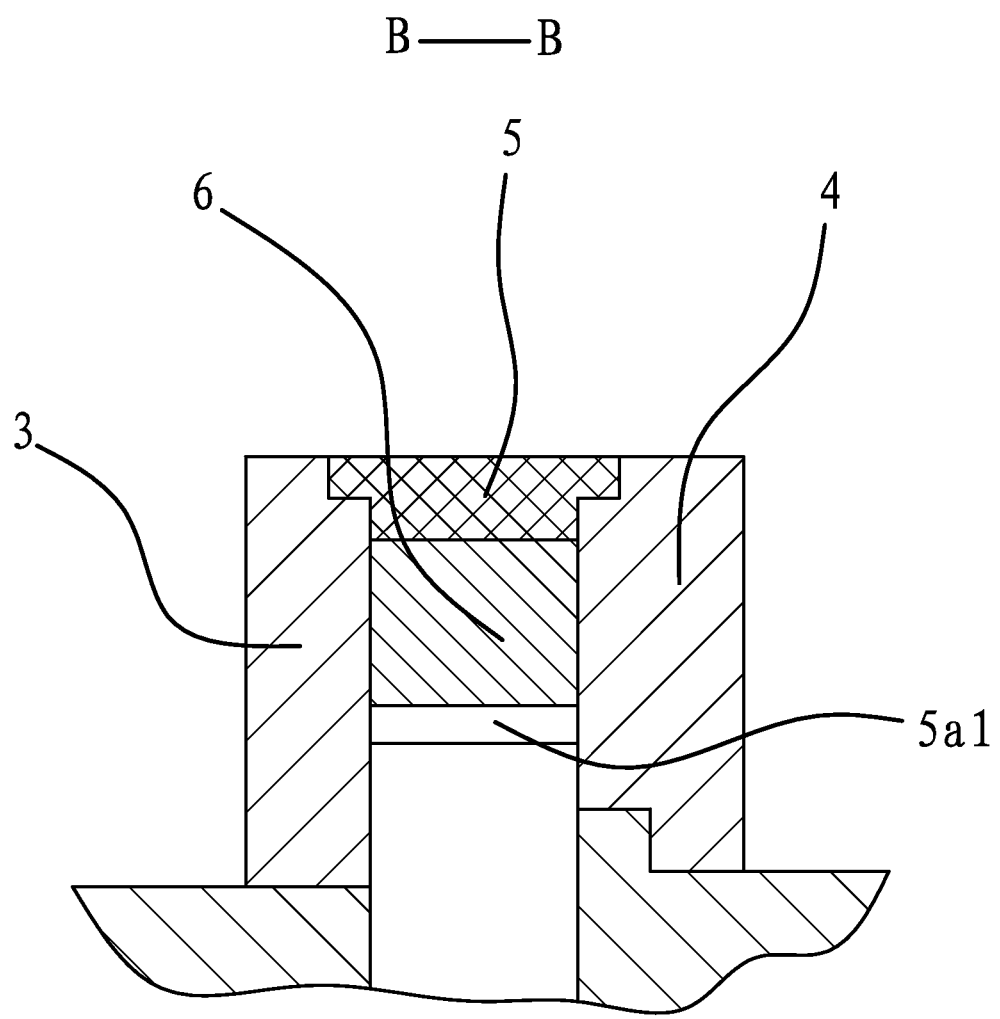
FIG. 5 is a sectional schematic diagram taken along B-B in FIG. 2.

As shown in FIGS. 1, 3 and 4, an annular retainer 5 is provided between the edge of the chassis 3 and the edge of the compression ring 4. The inner side of the retainer 5 is fixedly connected with four supporting posts 6, the ends of which are pressed against the chassis 3 and the compression ring 4 respectively, referring to FIG. 5. In this embodiment, the retainer 5 has a cylindrical supporting seat 5a integrally connected therewith on its inner side, and the supporting posts 6 are connected with the supporting seat 5a. The retainer 5 and the supporting seat 5a are both made of plastic materials and the supporting seat 5a has a gap 5a1 extending therethrough on its side.

In the drive device for the belt axis of the winch, the crowbar is inserted into the socket 2b and turned back and forth, which turns the rotary cylinder 2 back and forth. The rotary cylinder 2 is axially fixed on the stationary seat 12 via the stop edge 2a thereon. In other words, the rotary cylinder 2 could rotate relative to the stationary seat 12 while not being separated from the stationary seat. While the ratchet wheel 9 is turned back and forth with the rotary cylinder 2, the pawls 8 could only be pulled when the ratchet wheel is turned in one direction and the pawls 8 slide over the teeth of the ratchet wheel 9 when the ratchet wheel is turned in the other direction. Apparently, after the rotary cylinder 2 brings the ratchet wheel 9 to turn back and forth, the stationary seat having the pawls thereon could only be turned in one way. The continuous one-way rotation of the belt axis 1, which is driven by the one-way rotation of the stationary seat 12, makes the binding belt tight. In order to ensure the pawls 8 are constantly embedded into the ratchet wheel 9, a torsion spring 11 is provided between the pawls 8 and the chassis 3, and the pawls 8 constantly abut against the ratchet wheel 9 by the elastic force of the torsion spring 11.

In addition, in order for the combination of the ratchet wheel 9 and the pawls 8 to smoothly transmit dynamic force in one way, the retainer 5 is further provided with an oil cup 10 in cavity communication with the chassis 3 and the compression ring 4. As the oil cup 10 is periodically added with oil, the ratchet wheel 9 could cooperate with the pawls 8 in a more reliable manner after the oil enters into the ratchet wheel 9.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

Although these terms are used herein, such as valve body 1, inflow conduit 1a and outflow conduit 1b, the other similar terms could also be used. These terms are merely used to describe and explain the essence of the invention more conveniently, and any limitation to said terms is regarded as departing from the spirit of the invention.

LIST OF REFERENCE NUMERALS

1 belt axis
2 rotary cylinder
2a stop edge
2b socket
3 chassis
4 compression ring
5 retainer
5a supporting seat
5a1 gap
6 supporting post
7 connecting pin
8 pawl
9 ratchet wheel
10 oil cup
11 torsion spring
12 stationary seat
13 spring

What is claimed is:

1. A drive device for a belt axis of a winch disposed at one end of the belt axis (1) of the winch, comprising:
   a stationary seat (12) fixedly connected with the belt axis (1) of the winch, both the stationary seat (12) and the belt axis (1) being cylindrical;
   a rotary cylinder (2) with a socket (2b) for inserting a crowbar, the rotary cylinder (2) is fixed to the stationary seat (12) and has a central axis overlapping with that of the stationary seat (12); and
   a unidirectional mechanism provided between the rotary cylinder (2) and the belt axis (1), the unidirectional mechanism operating by engagement of teeth of a ratchet wheel (9) and the belt axis (1) is brought into continuous one-way rotation by using the unidirectional mechanism while the rotary cylinder (2) is turned back and forth;
   wherein the unidirectional mechanism includes pawls (8) hinged to the stationary seat (12) and a ratchet wheel (9) fixedly connected with an end of the rotary cylinder (2), in which the pawls (8) are engaged with the ratchet wheel (9), the stationary seat (12) has a chassis (3) in the shape of a round disk and a circular compression ring (4), the chassis (3) is fixedly connected to an end of the belt axis (1), the compression ring (4) is fixedly connected to the chassis (3) via connecting pins (7), and the pawls (8) are hinged between the compression ring (4) and the chassis (3) by the connecting pins (7).

2. The drive device for a belt axis of a winch as claimed in claim 1, characterized in that, springs (13) are covered on the connecting pins (7), ends of the springs (13) are pressed against the compression ring (4) and the pawls (8) respectively, and the pawls (8) tend to be engaged with the ratchet wheel (9) by means of the elastic force of the springs (13).

3. The drive device for a belt axis of a winch as claimed in claim 2, characterized in that, the rotary cylinder (2) has a projecting stop edge (2a) at an inner end, the stop edge (2a) is disposed between the compression ring (4) and the pawls (8) and the pawls (8) are located between the compression ring (4) and the chassis (3).

4. The drive device for a belt axis of a winch as claimed in claim 3, characterized in that, an annular retainer (5) is provided between an edge of the chassis (3) and an edge of the compression ring (4).

5. The drive device for a belt axis of a winch as claimed in claim 4, characterized in that, an inner side of the retainer (5) is fixedly connected with a plurality of supporting posts (6), and ends of the supporting posts (6) are pressed against the chassis (3) and the compression ring (4) respectively.

6. The drive device for a belt axis of a winch as claimed in claim 5, characterized in that, the retainer (5) has a cylindrical supporting seat (5a) integrally connected therewith on the inner side of the retainer (5), and the supporting posts (6) are connected with the supporting seat (5a).

7. The drive device for a belt axis of a winch as claimed in claim 6, characterized in that, the retainer (5) and the supporting seat (5a) are both made of plastic materials and the supporting seat (5a) has a gap (5a) extending therethrough on its side.

8. The drive device for a belt axis of a winch as claimed in claim 3, characterized in that, the chassis (3) is fixedly connected with the end of the belt axis (1) by welding.

9. The drive device for a belt axis of a winch as claimed in claim 5, characterized in that, the ratchet wheel (9) is fixedly connected with the end of the rotary cylinder (2) by welding.

10. The drive device for a belt axis of a winch as claimed in claim 2, characterized in that, the chassis (3) is fixedly connected with the end of the belt axis (1) by welding.

11. The drive device for a belt axis of a winch as claimed in claim 2, characterized in that, the ratchet wheel (9) is fixedly connected with the end of the rotary cylinder (2) by welding.

12. The drive device for a belt axis of a winch as claimed in claim 1, characterized in that, the chassis (3) is fixedly connected with the end of the belt axis (1) by welding.

* * * * *